United States Patent [19]

Wright

[11] Patent Number: 4,829,806

[45] Date of Patent: May 16, 1989

[54] VARIABLE TUBE OFFSET BENDER

[76] Inventor: Kent Wright, 4900 Park Dr., Carlsbad, Calif. 92008

[21] Appl. No.: 60,503

[22] Filed: Jun. 11, 1987

[51] Int. Cl.⁴ ............................................. B21J 13/08
[52] U.S. Cl. ........................................ 72/459; 72/402
[58] Field of Search ................. 72/457, 458, 459, 481, 72/482

[56] References Cited

U.S. PATENT DOCUMENTS

| | | | |
|---|---|---|---|
| 1,650,955 | 11/1927 | Miller | 72/459 |
| 1,835,264 | 12/1931 | Blythe | 72/459 |
| 1,859,406 | 5/1932 | Meighan | 72/459 |
| 2,349,525 | 5/1944 | St. Clair | 72/459 |
| 2,630,033 | 3/1953 | Stover | 72/459 |
| 4,620,431 | 11/1986 | Muldoon | 72/459 |

FOREIGN PATENT DOCUMENTS

| | | | |
|---|---|---|---|
| 107310 | 5/1939 | Australia | 72/459 |
| 1964 | 4/1846 | France | 72/459 |

Primary Examiner—David Jones
Attorney, Agent, or Firm—John J. Murphey

[57] ABSTRACT

A tube bender for making accurate offsets and saddles in electrical conduit wherein a first tube-bending anvil is adapted to be positioned flat against a mounting plate at various specified distances above a flat work surface, the distance of the offset or saddle, the plate and anvil being supported vertically above the surface on legs extending outward from the plate, the anvil used in cooperation with a second, hand-held tube-bending anvil, wherein a bendable tube supported therebetween can be formed into an offset with one downward motion applied to the second anvil for displacing the electrical conduit the distance of the offset and wherein a saddle may be formed by doubling an offset.

12 Claims, 7 Drawing Sheets

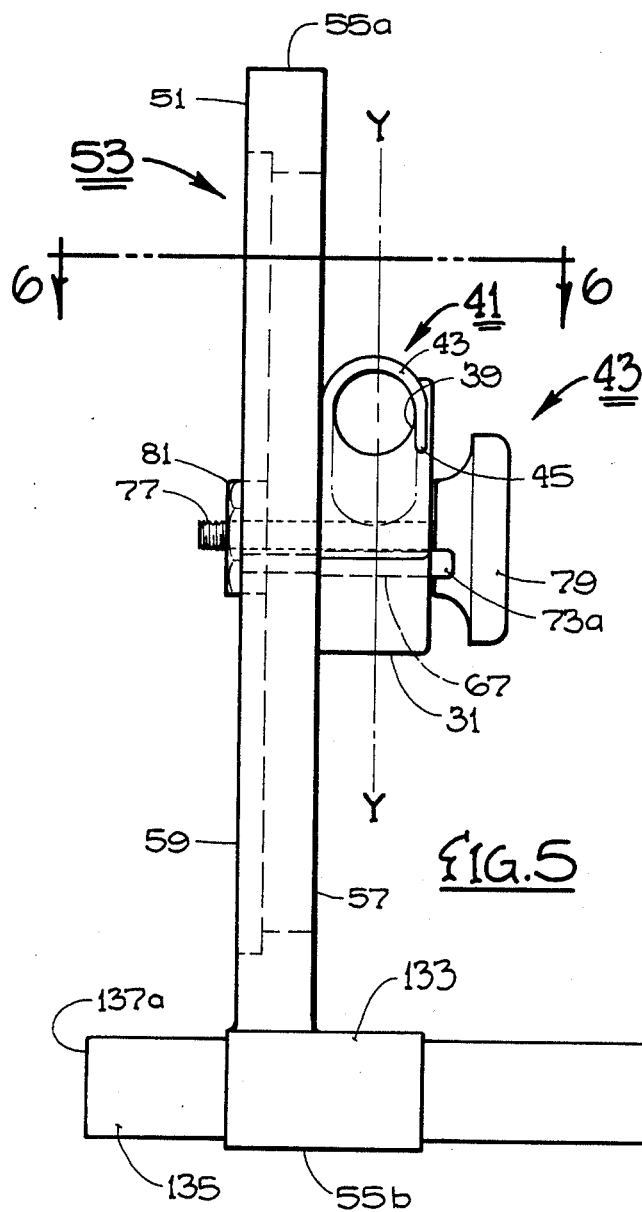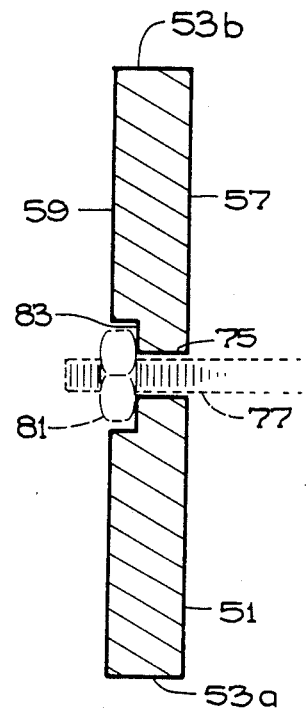
FIG.5
FIG.6

VARIABLE TUBE OFFSET BENDER

BACKGROUND OF THE INVENTION

Field of the Invention

This invention pertains to the field of hand tools. More particularly, this invention pertains to a hand-operated tool or apparatus for use in forming bends in certain bendable tubes such as, for example, tubes through which electrical wires pass, known as "conduit."

BACKGROUND OF THE INVENTION

Tubing is used in the construction industry to convey gasses and liquids, as well as to support electrical wires, from place to place. In the building industry, most tubing is used to direct liquids and electrical wires throughout a structure.

While there is some use of plastic tubing, the tubing used to contain wires is generally made of metal and known as "conduit". The reason for using metal over plastic in this instance is that conduit is usually installed after the building is partially or fully constructed and must be bent to follow the contours of the building such as around columns, pipes, pilasters, floor joists, etc., and the tubing must maintain its shape after it is bent around these obstructions. Metal tubing is more easily bent and holds its shape far better than plastic tubing.

The metal conduit generally used to carry electrical wires carries the generic name "Electrical Metal Tubing" or "EMT" conduit. It is usually made of aluminum alloy and has a relatively thin wall. Bending EMT conduit has historically been accomplished with a manual tube-bending tool of the type generally shown in U.S. Pat. Nos 1,379,016; 1,754,635; 1,878,754; 2,233,393; 2,349,525; 2,381,064; 2,630,033; 3,063,314; 4,587,832; and U.K. Pat. No. 2,092,036, as well as with a few machines of the type shown in U.S. Pat. No. 3,691,815 and Italian Pat. No. 629,437.

In these patented inventions, the conduit tube is generally laid in a groove formed in the convex edge portion of a shoe or bending anvil, clasped or temporarily held at one end thereof by a collar or hook, and the anvil rotated or rolled against a solid surface along the convex edge by force applied to a handle extending outward from the anvil on the opposite side from the groove. The desired degree of bend is usually "eyeballed", however, some attempts have been made to reduce the estimated degree of bend to a more precise measurement, see U.S. Pat. Nos. 2,349,525; 3,063,314; and, 4,587,832.

Where wires traverse a wall containing obstructions, such as columns, pipes or ducts, the conduit may be bent into a single offset or a double offset, the latter referred to as a "saddle". An offset is merely a displacement in the tube formed by two spaced-apart bends or arcs of the same angularity but in opposite directions. The span of tubing between the two bends is called the "offset span" and may vary in length depending upon a number of factors such as the total offset distance, the required acuteness of the offset angle, etc.

While bending a tube using the hand tools shown in the prior art is subject to certain inaccuracies in angularity, forming an offset having two bends is more critical as the inaccuracies in each bend rarely compensate each other and, more often than not, they accumulate to cause a larger overall error. An inaccurate offset means that one leg of the tube will either extend too far from the wall to make mounting difficult or fit too close such that the other leg is pulled out of its wall attachment. The prior art has not cured this problem.

Even worse are the inaccuracies that arise in the formation of a saddle. A saddle comprises two offsets in close opposition so that the result is tubing whose major conduit axis lies in a common plane, for example, the plane adjacent a flat wall, and where one offset extends the tubing out of the plane of the wall and another offset returns the tubing to the plane to permit the tube to pass around the obstruction. Saddles contain four angles, each with its own inaccuracy. The inaccuracy of each angle, created by the mere "eyeballing" of hand-bending, as aforedescribed, may and often does create such disparity in the offset spans that the result is unacceptable from a building code point of view, is sloppy and looks poor, and results in the need to rebend the offset angles or redo the whole saddle, thus causing a waste of material and a loss of work time.

These problems have been completely overcome in the instant invention. This invention is a compact, sturdy apparatus for use in rapidly forming very accurate offsets and saddles. An offset of extreme accuracy may be formed in one swift motion; a saddle also of exact dimensions may be formed in two swift motions. The astonishing accuracy and swift accomplishment of forming these bends using this invention saves energy, work time and material. The ease of use of the invention allows accurate offsets and saddles to be formed by less experienced personnel such as trainees. Offsets need not be redone, tubing is not wasted and work may continue without undue interruption.

SUMMARY OF THE INVENTION

This invention is an apparatus for rapidly forming accurate offsets in bendable tubes comprising a tube bending anvil, containing an arcuate edge portion having formed therein a planar tube-receiving groove and a tube-retaining means for clasping the tube at one end of the groove, means for arranging the tube-receiving groove normal to a flat work surface and accurately positioning it above the surface with the tube-retaining means at the apex thereof, the means including a mounting plate and legs on the plate for supporting it vertically upon the work surface. The invention also includes means to adjust the height of the anvil accurately above the work surface and the use of a second tube-bending anvil having a handle extending therefrom for providing a combination of downward pressure on a tube mounted in the first anvil above the work surface and applying rotative force to the second anvil to simultaneously cause the first offset bend or arc to be formed about the first anvil, above the work surface, and the second offset arc formed about the second anvil adjacent the work surface.

The main object of this invention is an apparatus for forming offsets and saddles in bendable tubing with accuracies and speed heretofore unknown in the prior art. Other objects of the invention include a means for removing the estimation in the normal bending operations in forming offsets and saddles, a means of swiftly and accurately changing the degree of offset needed for a particular operation, means for forming offsets and for separately forming saddles without the use of large equipment, and apparatus that is sturdy and compact and easily transported from job site to job site, that is amenable to making offset bends of a variety of angles and radii and an apparatus capable of bending a variety of sizes of tubes. These and other objects of the invention will appear more clearly upon reading the following Description of the Preferred Embodiment taken together with the drawings appended hereto. The scope of protection the inventor seeks may be gleaned from a fair reading of the claims that conclude this specification.

DESCRIPTION OF THE DRAWINGS

FIG. 5 is an end view of the anvil and mounting plate shown in FIG. 4;

FIG. 6 is a cross-sectional view of part of the slot and channel taken along lines 6—6 in FIG. 5.

DESCRIPTION OF THE PREFERRED EMBODIMENT

Figure 1:
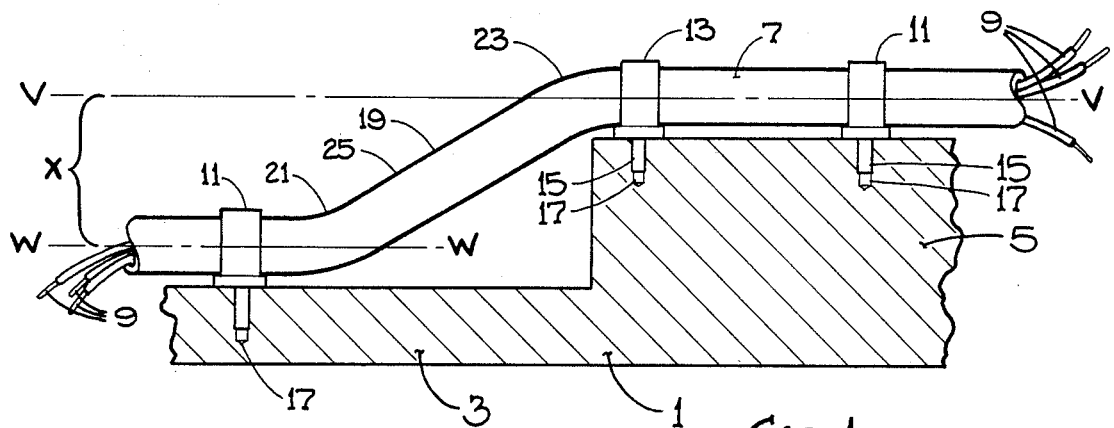
FIG. 1 is a top plan view of a typical wall having a change in wall thickness showing a required offset formed in conduit attached to the wall.

Shown in FIG. 1 is a top plan view of a typical wall 1 having an area 3 of one thickness and an area 5 of greater thickness. Adjacent one surface (generally the inside surface) of wall 1 is mounted an elongated tube or conduit 7, of the EMT variety previously mentioned, carrying electrical lines 9. Conduit 7 is mounted adjacent the surface of wall 1 by a series of spaced-apart fasteners 11 that generally have a conduit enclosing portion 13 and a mounting pin 15 extending outward therefrom for insertion in a hole 17 drilled or otherwise formed in wall 1. Conduit 7 traverses the span between wall thickness 3 and wall thickness 5 through an offset 19 that comprises a first offset bend or arc 21 and a second or return offset bend or arc 23. The portion of conduit 7 traversing the distance between arcs 21 and 23 is termed the "offset span" 25. The measured distance between the axes of the straight portions of conduit 7 outside of offset 19, shown as v—v and w—w, is referred to as the "offset distance" x.

Figure 2:
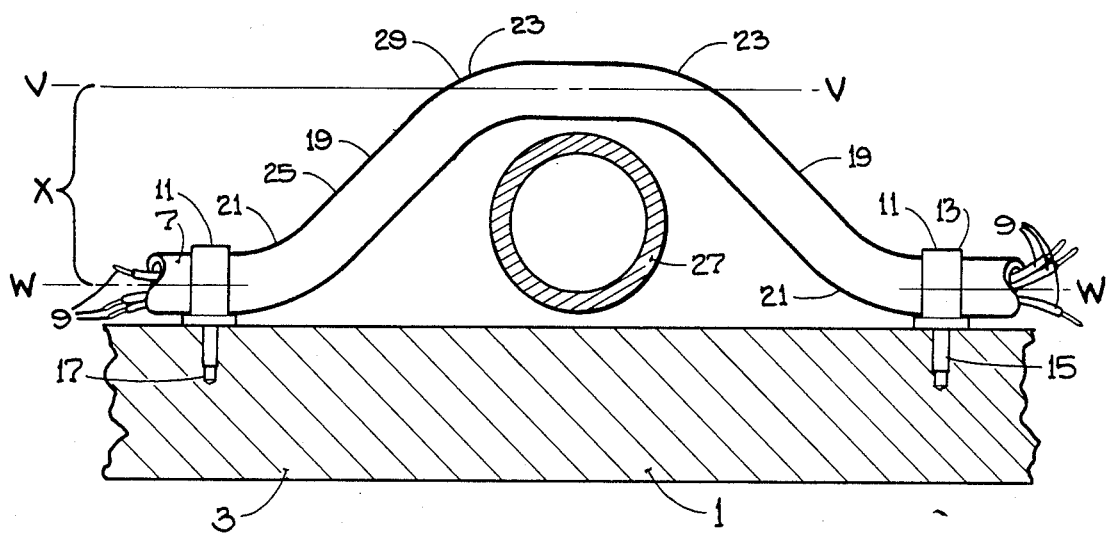
FIG. 2 is a top plan view of a typical wall having a vertical pipe adjacent thereto showing a required saddle formed in conduit attached to the wall.

As shown in FIG. 2, where conduit 7 is required to bend around or traverse an obstruction such as a pipe 27, a saddle 29 is required to be formed in conduit 7. Saddle 29 contains two offsets in opposed or face-to-face arrangement and comprises two first offset bends 21, spaced on opposite sides of pipe 27, and two separated but closer spaced return offset bends or arcs 23. The distance between return offset bends 23 may vary according to the width of the projection outward from the wall around which conduit 7 is to traverse. It may be small to transverse a pipe or larger, should the obstruction be a wide air conditioning or heating duct, etc. The lateral distance between conduit axis v—v and conduit span axis w—w as shown in FIG. 2 is still termed the "offset distance" x.

Figure 3:
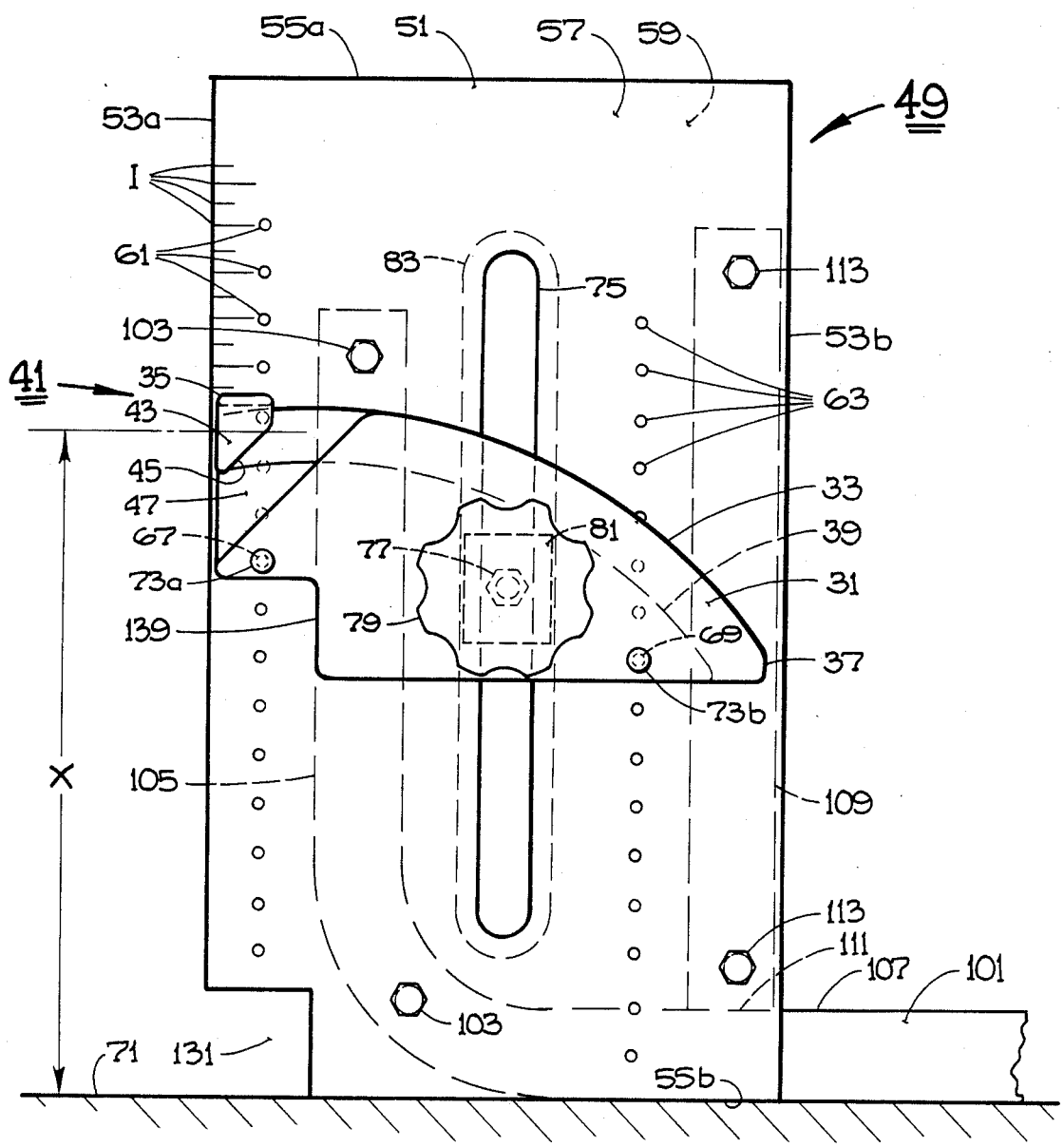
FIG. 3 is a front plan view of one embodiment of the means to support the tube-bending anvil of this invention above a work surface.

One embodiment of this invention is shown in FIG. 3 and comprises a tube-bending anvil 31, usually made of metal, such as cast iron, to withstand the rigors of tube bending, that contain an arcuate edge portion 33 of set radius spanning ends 35 and 37. A planar tube-receiving groove 39 is formed in edge portion 33 between ends 35 and 37 of a radius sufficient to receive a bendable tube therein. The axis of groove 39 lies in a plane z—z (FIG. 5). At edge portion end 35 is located tube-retaining means 41 which is used to temporarily anchor a tube in groove 39 for the bending operation. Means 41 is shown to comprise a hook 43 of short length extending up and over top of groove 39 and terminating at end 45. An offset groove 47 is formed in anvil 31, below hook 43, in a downward or inward direction from groove 39. In practice, a tube is inserted into offset groove 47 under hook 43 and then rotated to engage hook 43 and place it tangential to groove 39 at end 35. To remove the tube the steps are reversed. Means 41 may also take the form of a collar located at edge portion end 35 into which the tube is temporarily inserted, see U.S. Pat. No. 1,878,754.

Means 49 is next provided to arrange anvil 31 and its tubereceiving groove 39, with its plane y—y, normal to a flat work surface and accurately positioned thereabove with said means 41 at the uppermost position or apex of arcuate edge portion 33.

Means 49, comprises a mounting plate 51 defined by spaced-apart parallel side edges 53a and 53b, spaced-apart parallel top and bottom edges 55a and 55b and front surface 57 and rear surface 59. One embodiment of means 49 is shown in FIG. 3 to include first and second series of apertures 61 and 63 in spaced-apart vertical arrangement, series 61 positioned near plate side edge 53a and second series 63 positioned near plate side edge 53b. Said apertures 61 and 63 align with spaced-apart apertures 67 and 69 that are formed in anvil 31 near ends 35 and 37. First and second series of apertures 61 and 63 are arranged to adjust anvil 31 at specifically desired offset distances "x" above work surface 71 in usable increments such as half inch or quarter inch. These distances can be established using the measured indicia "I" scribed up front surface 57 of plate 51 near plate side edge 53a. This arrangement provides for accurate offset forming within the distances required of most construction operations. A pair of pins 73a and 73b are inserted in apertures 67 and 69 and adapted for insertion in the aligned apertures of first and second series 61 and 63 to anchor anvil 31 against plate 51.

A first vertical slot 75, formed through plate 51 may be included, generally centrally located or center-mounted between side edges 53a and 53b and adapted to receive therethrough a threaded pin or bolt 77 extending from a rotatable handle 79 and adapted to be threadably received in a nut 81 that is adapted to slide in a channel 83 formed in plate rear surface 59 (see FIG. 6). Anvil 31 may be moved into precise adjustment above work surface 71 and held against plate 51 by tightening clamp handle 79 and thereafter rigidly retained thereagainst by inserting pins 73a and 73b into the appropriate apertures of first and second series 61 and 63.

Figure 4:
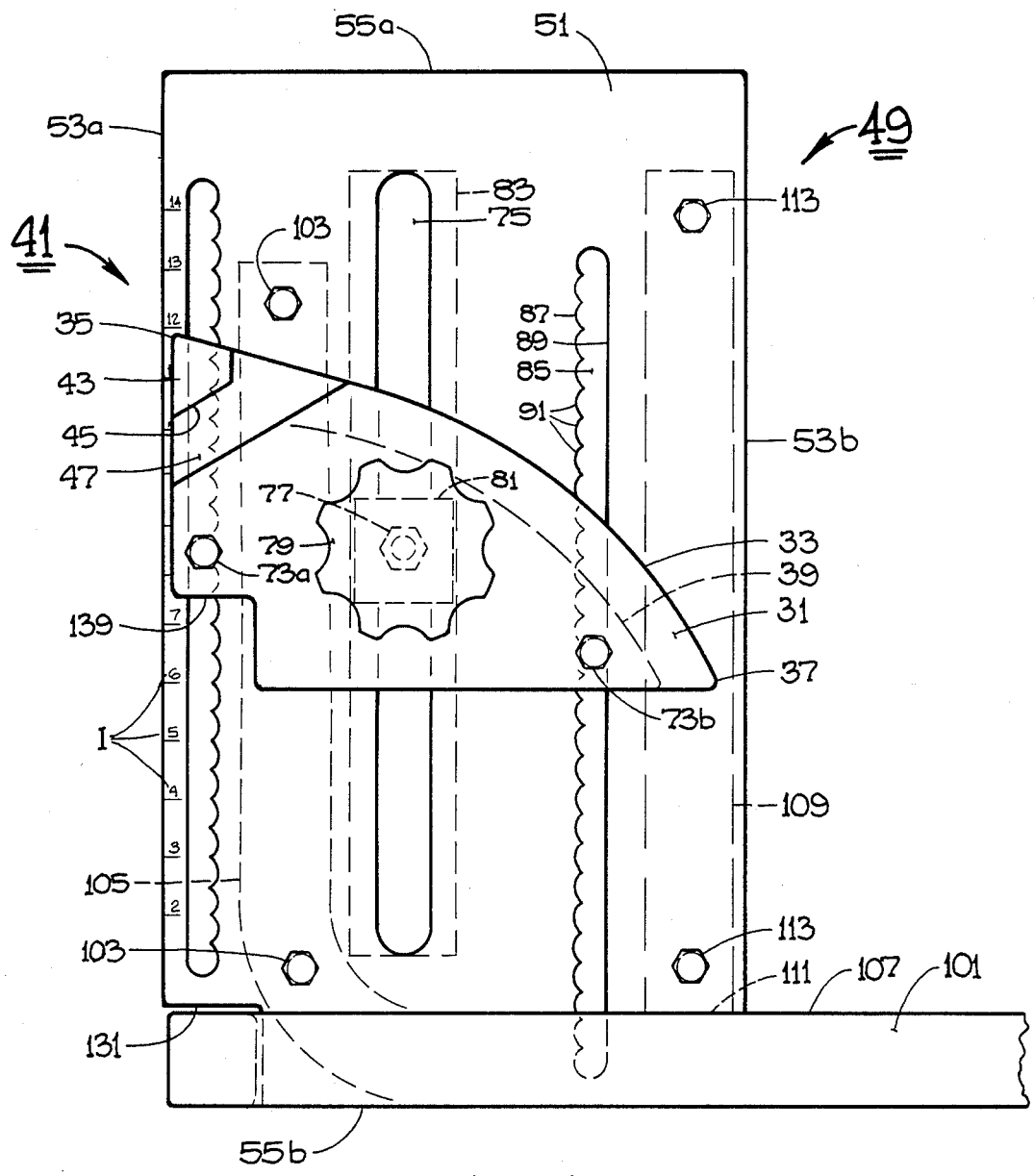
FIG. 4 is a front plan view of another embodiment of the means to support the tube-bending anvil of this invention above a work surface.

Another preferred embodiment of means 49 is shown in FIG. 4. First vertical slot 75 is shown in combination with a second vertical slot 85, formed in mounting plate 51 and spaced apart from first vertical slot 75, having parallel, spaced-apart opposed slot edges 87 and 89. Slot edge 87 is provided with a series of serrations 91 substantially along its entire length. Pin 73b is sized to pass freely up and down second slot 85 when clamp handle 79 is loosened and anvil 31 rotated slightly counterclockwise to allow it to move up and down to different distances above work surface 71. Upon reaching the desired distance, anvil 31 is rotated slightly clockwise to establish tube-retaining means 41 in the uppermost or apex position and clamp handle 79 is tightened against nut 81 and thereafter a tube is inserted in tube-retaining means 41 as shown in dotted outline. Pin 73b is now in contact with serrations 91 and, as downward pressure is applied to the tube extending from retaining means 41 above tube receiving groove 39, for the purpose of starting to form the offset, pin 73b jams against serrations 91 to prevent any vertical inter-movement between anvil 31 and mounting plate 51.

For more rigidity in the apparatus, a third vertical slot 93 is shown formed in plate 51 spaced apart from second vertical slot 85 and on the opposite side therefrom from first slot 75. Third vertical slot 93 is bordered by parallel spaced-apart slot edges 95 and 97 wherein slot edge 97 has formed therein a series of serrations 99. Just as in the previous embodiment, pin 73a is adapted to move freely in slot 93 when anvil 31 is rotated slightly counter clockwise and then moves into contact with serrations 99 when it is "straightened" so that pin 73a jams against serrations 99 to prevent vertical movement during subsequent use of the apparatus.

Figure 7:
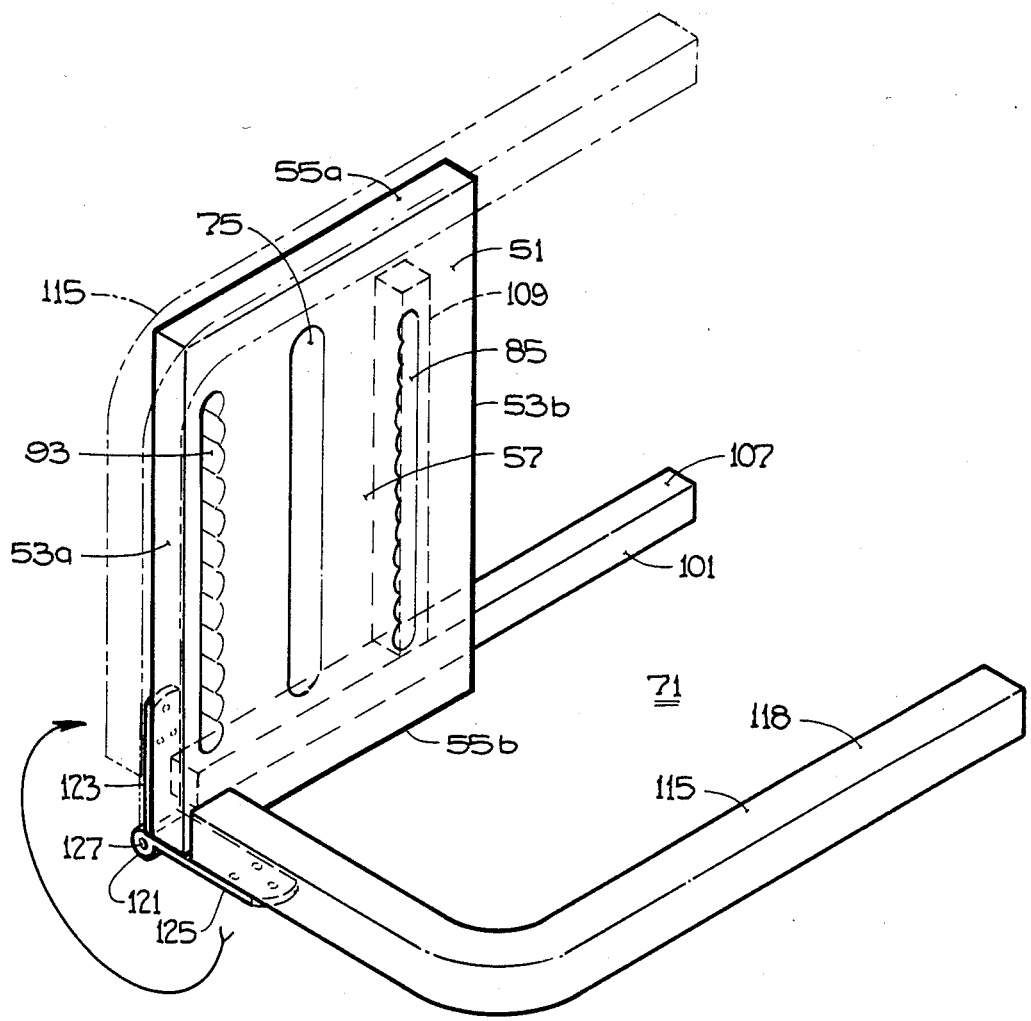
FIG. 7 is an isometric view of one embodiment of the legs supporting the plate and anvil on the work surface with the anvil removed for clarity.

The apparatus is supported on work surface 71 by legs attached to plate 51. In FIG. 7 is shown one embodiment of such a support. A first "L-shaped" leg 101 is provided, attached to plate rear surface 59 by bolts 103 or welding (not shown) or the like. Leg 101 has a vertical portion 105 located adjacent plate side edge 53a and a horizontal portion 107 extending along plate bottom edge 55b and beyond plate 51. A vertical support bar 109 extends down plate rear surface 59 adjacent plate side edge 53b and is attached to horizontal leg portion 107 by welding at 111, said bar attached to plate 51 by bolts 113.

A second "L-shaped" leg 115 of terminal length is provided, having a first horizontal portion 117 extending outward from plate 51 and attached thereto at one end 119 by a hinge 121 and a second horizontal portion 118 extending substantially parallel to the plane of plate 51. Hinge 121 comprises two hinged tabs 123 and 125; tab 123 is welded or otherwise attached to plate rear surface 59 and leg end 119 is attached to tab 125 a short distance out from hinge pin 127 to allow leg 115 to swing from its support position in front of plate 51, shown in solid outline in FIG. 7, around behind plate 51 to a storage position, shown in dotted outline in the same Figure.

In FIGS. 3, 4 and 5 are shown another embodiment of support legs for plate 51. The same first "L-shaped" leg 101 and vertical support bar 109 are used, however, second "L-shaped" leg 115 has been replaced. An opening 131 is formed in the lower corner of plate 51, at the junction of plate side edge 53a and bottom edge 55b. A short, hollow sleeve 133 is positioned in opening 131, arranged normal to plate 51 and rigidly attached thereto such as by welding. A short stub 135 having terminal ends 137a and 137b is slidingly received in sleeve 133 and arranged normal to plate 51 with ends 137a and 137b extending from opposite sides of plate 51 to provide front-to-rear support to the apparatus. A cut-out 139 is made in anvil 31 to allow said anvil to avoid interference with sleeve 133 and moved closer to work surface 71.

Figure 8:
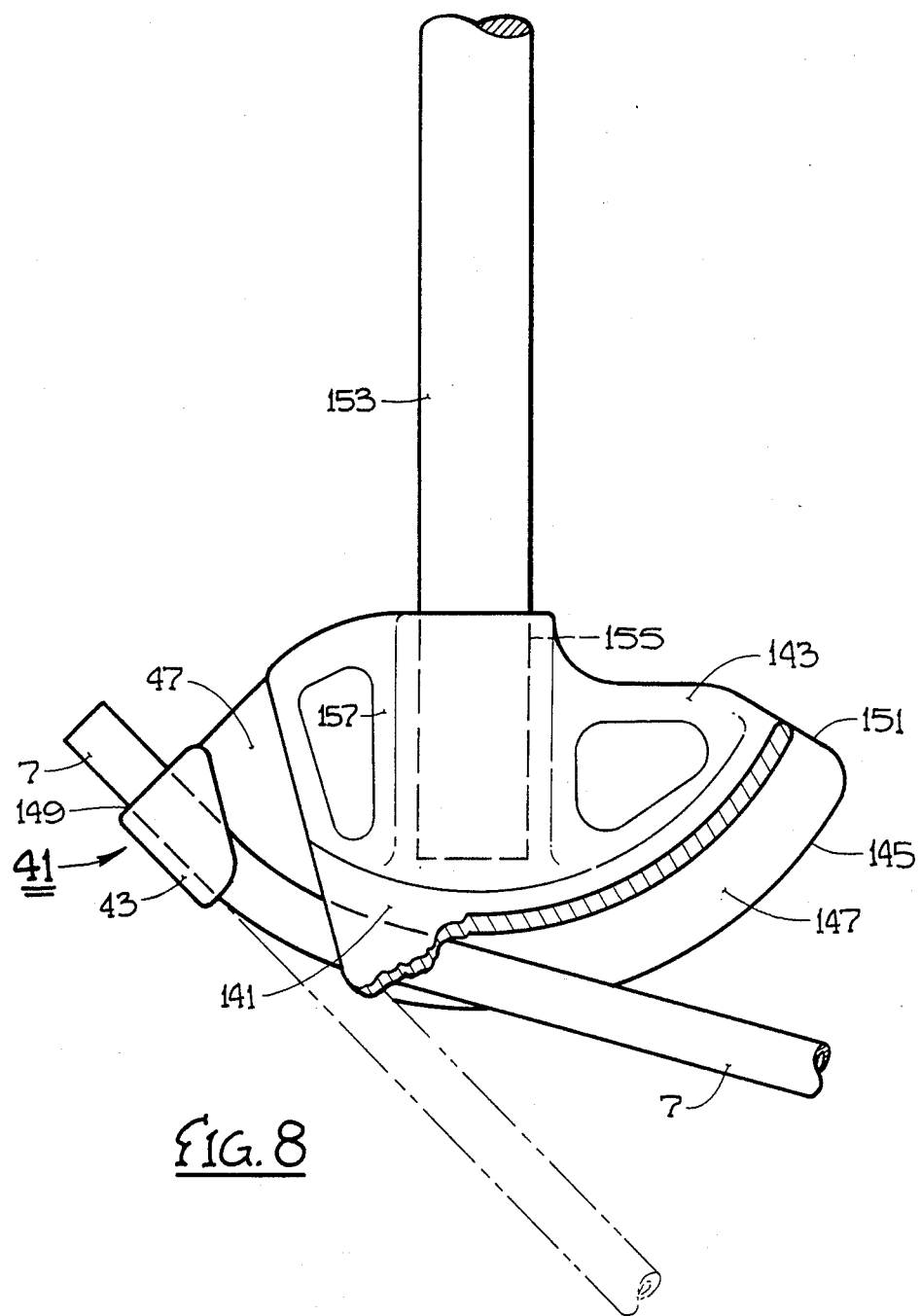
FIG. 8 is a front plan view of a typical second tube-bending anvil used in conjunction with the apparatus of this invention.
Figure 9:
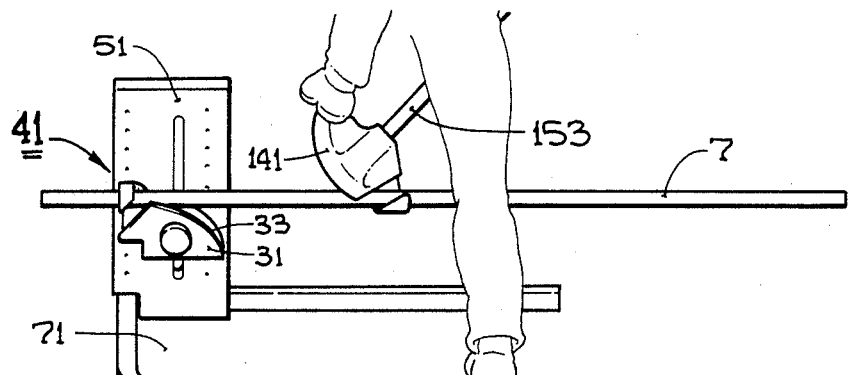
FIG. 9 shows the embodiment of FIG. 3 being used to form an offset.
Figure 10:
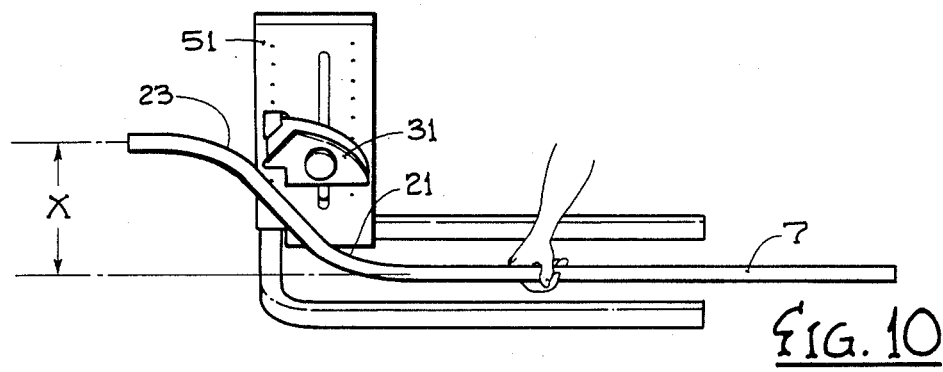
FIG. 10 shows the offset produced in FIG. 9.

To form an offset or a saddle with anvil 31 a second anvil 141 is needed. Second anvil 141 is generally shown in FIG. 8 to comprise a shoe 143 containing an arcuate edge portion 145 having formed therein a planar tube-receiving groove 147 terminated at groove ends 149 and 151 and a tube-retaining means 41 such as a hook 43 and associated groove 47 for temporarily clasping a tube at end 149 of groove 147. A handle 153 extends from a socket 155 located on the opposite or concave side of edge portion 145 and attached to edge portion 145 by webbing 157. As shown in FIG. 9, an offset is formed in conduit 7, an offset distance "x", by mounting anvil 31 above work surface 71 the distance "x" and thereafter positioning conduit 7 in tube retaining means 41 located at the highest point or apex of edge portion 33. Second anvil 141 is thereafter operatively positioned on conduit 7 spaced apart from first anvil 31 with its tube-receiving groove 147 aligned in common plane y—y with tube-retaining groove 39 of anvil 31 and tube-retaining means 41 of each anvil facing away from each other. The operator's foot or arm is place on the top of second anvil 141 and vertical downward force is applied thereto. Simultaneously, handle 153 extending from second anvil 141 is rotated from its outwardly angled initial position, shown in FIG. 9 toward the vertical or inward toward plate 51. The simultaneous downward pressure on conduit 7 and the rotation of second anvil 141 causes second offset arc 23 to be formed in groove 39 of first anvil 31 and first offset arc 21 to be formed in groove 147 of second anvil 141. The resulting offset is shown in FIG. 10. It should be noted that only one setting is needed to be made for first anvil 31 and only one bending operation performed to make the full offset.

Figure 11:
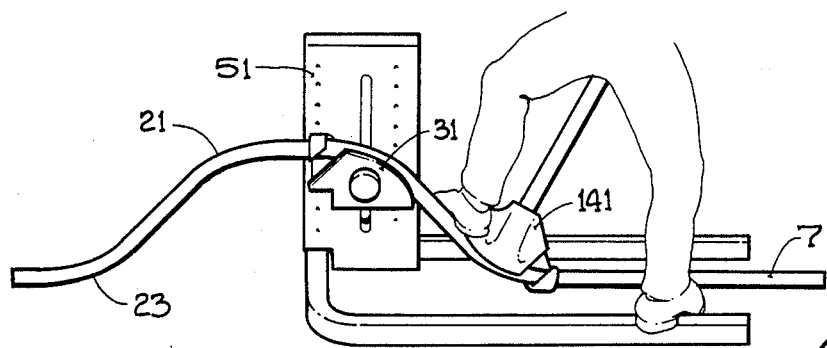
FIG. 11 shows the embodiment of FIG. 3 being used to form a saddle.
Figure 12:
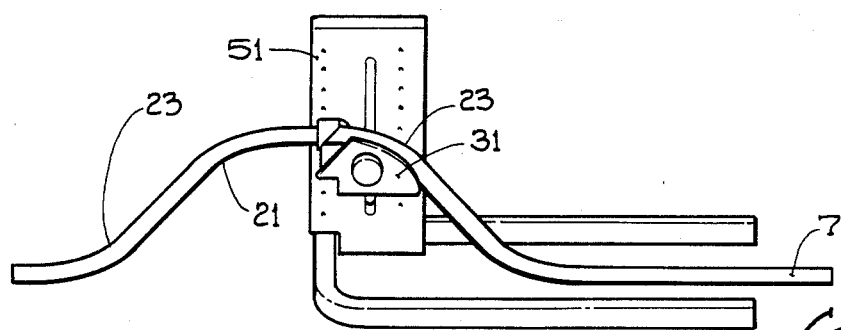
FIG. 12 shows the saddle produced in FIG. 11.

To make a saddle, the first offset, shown in FIG. 10 is simply reversed as shown in FIG. 11 and the upper level displaced portion of conduit 7 is reinserted in first anvil 31. A similar downward stroke and rotation of second anvil 141 is performed as shown in FIG. 11 and the full saddle is formed in this second motion. The resultant saddle is shown in FIG. 12.

What is claimed is:

1. Apparatus for use in forming accurate offsets and saddles in bendable tubes comprising:
   (a) a first tube-bending anvil containing an arcuate edge portion having formed therein a planar tube-receiving groove and a tube-retaining means for temporarily clasping a tube in one end of said groove; and
   (b) means for arranging said tube receiving groove normal to a work surface and accurately positioning said anvil a distance above the surface with said tube-retaining means at the apex thereof, said distance being the offset distance desired, wherein said means includes:
      (1) a separate mounting plate on which said anvil is rigidly fixable for positioning over a range of offset distances above the work surface including a series of apertures formed in said plate in vertical arrangement that coincide with apertures formed in said first anvil for receipt therethrough of pin members to temporarily mount said anvil to said plate at various heights above the work surface corresponding to the respective offset distances desired in the bent tube; and, (2) legs attached to said mounting plate, extending out of the plane of said plate, to support it independently on the work surface.

2. The apparatus of claim 1 wherein said plate further has formed therethrough a first vertical slot adapted to receive therethrough a pin extending from an adjustably-tightenable handle mounted adjacent said first anvil for anchoring said anvil thereto.

3. The apparatus of claim 1 wherein said legs include:
(a) a first L-shaped leg attached to said plate having a vertical portion attached to said plate and a horizontal portion extending from said vertical portion;
(b) a vertical support bar attached to said plate and spaced apart from said vertical portion of said first L-shaped leg and attached to said horizontal portion thereof; and,
(c) a second L-shaped leg of terminal length having a first horizontal portion extending outward from said plate, hingedly attached thereto at one end thereof, and a second horizontal portion extending substantially parallel to said plate;
(d) said hinged attachment adapted to allow said second L-shaped leg to be pivoted around and behind said plate for folded storage therewith.

4. The apparatus of claim 1 wherein said legs include:
(a) a first L-shaped leg attached to said plate having a vertical portion attached to said plate and a horizontal portion extending from said vertical portion;
(b) a vertical support bar attached to said plate and spaced apart from said vertical portion of said first L-shaped leg and attached to said horizontal portion thereof; and,
(c) a stub, slidingly received in a hollow sleeve attached to said plate at the lower edge thereof, arranged normal to said plate and extending outward therefrom.

5. Apparatus for forming accurate offsets and saddles in bendable tubes, comprising:
(a) a first tube-bending anvil containing a first arcuate edge portion having formed therein a first planar tube-receiving groove and a first tube-retaining means for temporarily clasping a tube in one end of said groove;
(b) means for arranging said first tube-receiving groove normal to a flat work surface and accurately positioning said first anvil a distance above the surface with said tube-retaining means at the apex thereof, said means being the offset distance desired in the tube, wherein said means includes a separate mounting plate and legs attached thereto extending out from the plane of said plate to support said plate independently and vertically on the work surface and further including:
(1) a first vertical slot formed through said plate adapted to receive therethrough a pin extending from an adjustably-tightenable handle mounted adjacent said first anvil for anchoring said anvil thereto;
(2) a second vertical slot spaced apart from said first vertical slot, having spaced-apart, opposed edges wherein said edge nearest said first vertical slot contains a series of serrations; and,
(3) a first pin extending from said first anvil through said second slot adapted to pass freely up and down said slot when said clamp is loosened and said anvil is rotated slightly clockwise and repositioning to a new height above the work surface and further adapted to jam against said serrations when said anvil is rotated slightly clockwise and said clamp is tightened, a bendable tube is inserted horizontally in said first anvil groove and into engagement with said tube retaining means and downward pressure is applied to the tube to form a second offset arc causing said first anvil to rotate slightly in the direction of the bend; and,
(4) a second tube-bending anvil containing a second arcuate edge portion having formed therein a second planar tube-receiving groove and a second tube-retaining means for temporarily clasping the tube in one end of said groove and having a handle extending from the opposite side of said second edge portion from said second groove, said first and said second anvils arranged with their respective grooves lying in a common plane and their respective tube-retaining means facing away from each other, so that a bendable tube placed in said grooves and said tube-bending means will undergo bending into an offset with a precise offset distance when a downward force is applied to said second anvil to move the tube lying against said second arcuate edge portion of said second anvil into contact with the work surface and simultaneously, said second edge portion is rotated along the length of its associated second tube-receiving groove in the direction of said first anvil.

6. The apparatus of claim 5 including a third vertical slot, spaced apart from said first vertical slot and on the opposite side thereof from said second vertical slot, having spaced-apart opposed edges wherein said edge nearest said first vertical slot contains a series of serrations and a second pin extending from said first anvil through said third slot adapted to pass freely up and down said slot when said clamp is loosened and said anvil is rotated slightly counterclockwise and repositioned to a new height above the work surface and further adapted to jam against said serrated edge when said anvil is rotated slightly counterclockwise and said clamp tightened, a tube is inserted horizontally in said anvil groove and into engagement with said tube-retaining means and downward pressure is applied on the tube to form a second offset arc causing said first anvil to rotate slightly in the direction of the bend.

7. Apparatus for forming accurate offsets and saddles in bendable tubes comprising:
(a) a first tube-bending anvil containing a first arcuate edge portion having formed therein a first planar tube-receiving groove and a first tube-retaining means for temporarily clasping a tube in one end of said groove;
(b) means for arranging said first tube-receiving groove normal to a flat work surface and accurately positioning said first anvil a distance above the surface said first tube-retaining means at the apex thereof, said distance being the offset distance desired in the tube, wherein said first means includes a separate mounting plate and legs attached thereto extending out from the plane of said plate to support said plate independently and vertically on the work surface and further including a series of apertures formed in said plate in vertical arrangement that coincide with apertures formed in said first anvil for receipt therethrough of pin members to temporarily mount said anvil to said plate at various offset distances above the work surface; and, (c) a second tube-bending anvil containing a second arcuate edge portion having formed therein a second planar tube-receiving groove and a second tube-retaining means for temporarily clasping a tube in one end of said second groove and having a handle extending from the opposite side of second edge portion from said groove, said first and second anvils arranged with their respective grooves lying in a common plane and their respective tube-retaining means facing away from each other so that a bendable tube placed in said grooves and said tube-retaining means will undergo bending into an offset with a precise offset distance when a downward force is applied to said second anvil to move the tube lying against said second arcuate edge portion of said second anvil into contact with a work surface and simultaneously said second edge portion is rotated along the length of its associated tube-receiving groove in the direction of said first anvil.

8. The apparatus of claim 7 wherein said plate further has formed therethrough a first vertical slot that aligns with a threaded pin extending from an adjustably-tightenable clamp adjacent said first anvil for threaded engagement with a nut on the opposite side of said plate for use in moving and temporarily securing said first anvil in contact with said mounting plate.

9. The apparatus of claim 7 wherein said legs include:
(a) a first L-shaped leg attached to said plate having a vertical portion attached to said plate and a horizontal portion extending from said vertical portion;
(b) a vertical support bar attached to said plate and spaced apart from said vertical portion of said first L-shaped leg and attached to said horizontal portion thereof; and,
(c) a second L-shaped leg of terminal length having a first horizontal portion extending outwardly from said plate, hingedly attached thereto at one end thereof, and a second horizontal portion extending substantially parallel to said plate;
(d) said hinged attachment adapted to allow said second L-shaped leg to be pivoted around and behind said plate for folded storage therewith.

10. The apparatus of claim 7 wherein said legs include:
(a) a first L-shaped leg attached to said plate having a vertical portion attached to said plate and a horizontal portion extending from said vertical portion;
(b) a vertical support bar attached to said plate and spaced apart from said vertical portion of said first L-shaped leg and attached to said horizontal portion thereof; and,
c) a stub, slidingly received in a hollow sleeve attached to said plate at the lower edge thereof, arranged normal to said plate and extending outward therefrom.

11. Apparatus for forming accurate offsets and saddles in bendable tubes comprising:
(a) a first tube-bending anvil containing a first arcuate edge portion having formed therein a first planar tube-receiving groove and a first tube-retaining means for temporarily clasping a tube in one end of said groove;
(b) means for arranging said first tube-receiving groove normal to a flat work surface and accurately positioning said first anvil a distance above the surface with said first tube-retaining means at the apex thereof, said distance being the offset distance desired in the tube, wherein said means includes a separate mounting plate and legs attached thereto extending out from the plane of said plate to support said plate independently and vertically on said work surface and further including:
(1) a first vertical slot formed in said plate adapted to receive therethrough a threaded pin extending from an adjustably-tightenable handle adjacent said first anvil for threaded receipt in a nut in sliding relationship on the opposite side of said plate;
(2) a second vertical slot formed in said plate spaced-apart from said first vertical slot having spaced-apart, opposed edges wherein said edge nearest said vertical slot contains a series of serrations; and,
(3) a first pin extending from said first anvil through said second slot adapted to pass freely up and down said slot when said clamp is loosened and said anvil is rotated slightly clockwise and repositioned to a new height above the work surface and further adapted to jam against said serrations when said anvil is rotated slightly clockwise and said clamp is tightened, a bendable tube is inserted horizontally in said first anvil group and into engagement with said tube-retaining means and downward pressure is applied to the tube to form a second offset arc causing said first anvil to rotate slightly in the direction of the bend; and, (c) a second tube-bending anvil containing a second arcuate edge portion having formed therein a second planar tube-receiving groove and a second tube-retaining means for temporarily clasping a tube in one end of said groove and having a handle extending from the opposite side of said edge portion from said groove, said first and second anvils arranged with their respective grooves lying in a common plane and their respective tube-retaining means facing away from each other so that a bendable tube placed in said grooves and said tube-retaining means will undergo bending into an offset with a precise offset distance when a downward force is applied to said second anvil to move the tube lying against said second arcuate portion of said second anvil into contact with the work surface and simultaneously said edge portion is rotated along the length of its associated tube-receiving groove in the direction of said first anvil.

12. The apparatus of claim 11 including a third vertical slot, spaced apart from said first vertical slot and on the opposite side thereof from said second vertical slot, having spaced-apart, opposed edges wherein said edges nearest said first vertical slot contain a series of serrations and the second pin extending from said first anvil through said third slot adapted to pass freely up and down said slot when said clamp is loosened and said anvil is rotated slightly counterclockwise and repositioned to a new height above the work surface and further adapted to jam against said serrated edge when said anvil is rotated slightly clockwise and said clamp tightened, a tube inserted horizontally in said anvil groove and into engagement with said tube-retaining means and downward pressure is applied to the tube to form a second offset arc causing said first anvil to rotate slightly in the direction of the bend.

* * * * *